United States Patent [19]

Ziaylek, Jr.

[11] 4,357,238

[45] Nov. 2, 1982

[54] SUBMERGED INLET HEAD FOR FIRE HOSES AND THE LIKE

[76] Inventor: Theodore Ziaylek, Jr., 140 Riverview Dr., Yardley, Pa. 19067

[21] Appl. No.: 238,242

[22] Filed: Feb. 24, 1981

[51] Int. Cl.³ .......... B01D 35/02

[52] U.S. Cl. .......... 210/232; 210/460; 285/272; 285/282

[58] Field of Search .......... 285/272-274, 285/282; 210/232, 459-463

[56] References Cited

U.S. PATENT DOCUMENTS

| | | | |
|---|---|---|---|
| 557,735 | 4/1896 | Warren | 210/460 X |
| 2,300,952 | 11/1942 | May | 210/460 |
| 2,318,220 | 5/1943 | Haselwood | 210/242.1 |
| 2,331,332 | 10/1943 | Latta | 55/356 X |
| 2,732,071 | 1/1956 | Crow | 210/460 X |
| 2,934,087 | 4/1960 | Crow | 137/590 |
| 2,934,831 | 3/1960 | Tasker | 34/125 |
| 3,206,036 | 9/1965 | Hawley | 210/460 |
| 3,495,714 | 2/1970 | Barton | 210/460 |
| 3,613,894 | 10/1971 | Clegg, Jr. | 210/456 |

*Primary Examiner*—John Adee

*Attorney, Agent, or Firm*—Frederick A. Zoda; John J. Kane; Albert Sperry

[57] ABSTRACT

A suction type inlet head, adapted for coupling to a fire hose or the like, is lowered into a tank, such as a portable tank known as a "dump-and-go" tank used in fighting fires in rural areas. The suction or inlet head is heavy enough to gravitate to and remain in stable position upon the bottom of the tank, and to this end has a flat weighted base plate which lies directly upon the bottom of the tank. The base plate supports, in a position slightly elevated above the tank bottom, an inlet nozzle retaining plate, having a wide transverse slot for receiving a transversely extending suction cylinder eccentrically, pivotally mounted upon the base. The suction cylinder merges into a hollow connecting portion on which there is provided a hose coupling for connecting the fire hose in communication with the cylinder. The hose coupling can thus be pivotally swung to selected positions of angularity in respect to the tank bottom, to correspondingly adjust the hose position in respect to the direction in which the hose extends from the tank bottom. Thumb screws extending through slots in the retainer plate and threaded into openings of the base may be turned home in selected positions to which the retaining plate is slidably adjusted, thus to cause the retaining plate to lock the suction cylinder in selected positions of rotatable adjustment.

13 Claims, 4 Drawing Figures

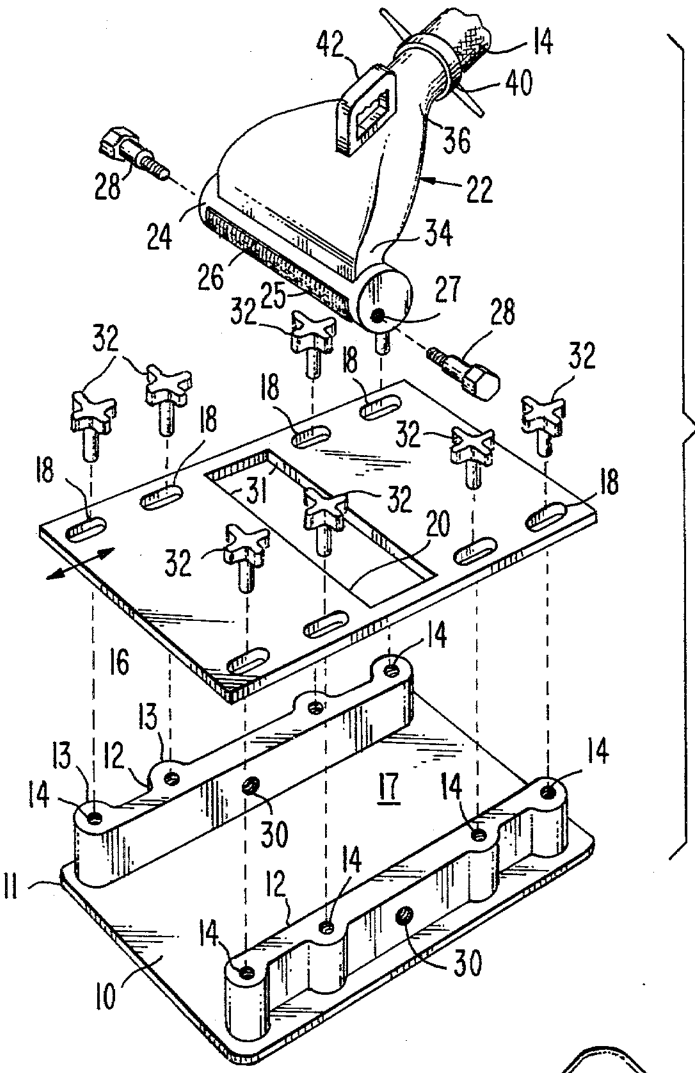
Fig. 1
Fig. 2
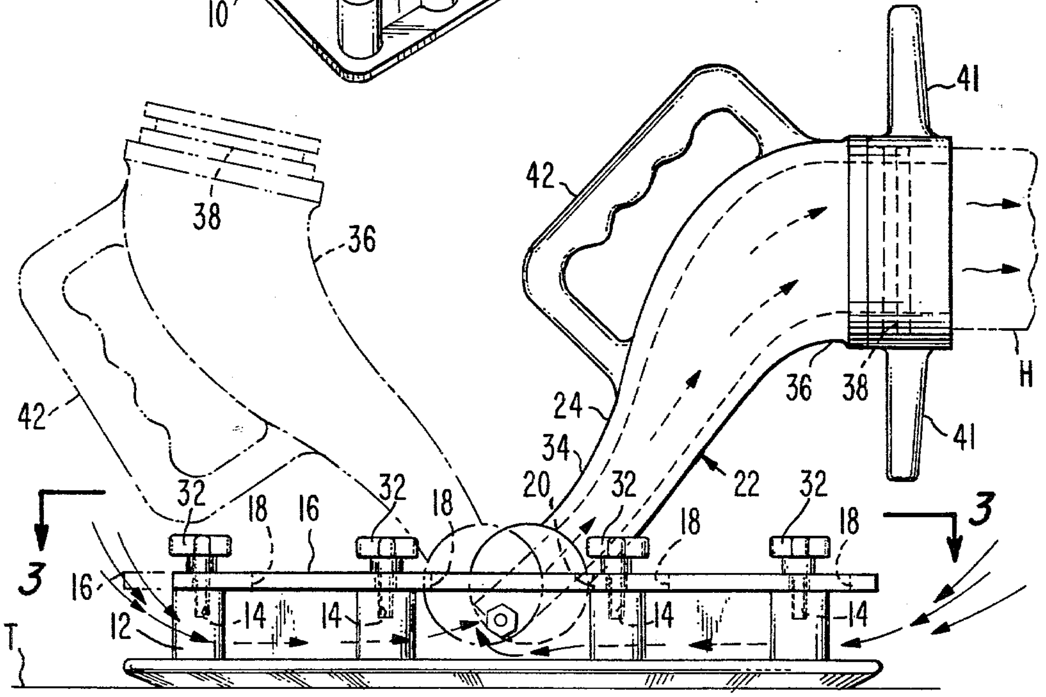

SUBMERGED INLET HEAD FOR FIRE HOSES AND THE LIKE

BACKGROUND OF THE INVENTION

1. Field of the Invention

The invention relates generally to inlet or suction heads for hoses, to facilitate retention of the hose end in close proximity to the bottom of a tank from which water is to be drawn, especially portable tanks brought to the scene of a fire to provide a supply of water for use in fighting the fire. In a more particular sense, the invention lies in the field of portable hose nozzles or inlets which may be equipped with strainers in the form of wire mesh screening to keep out foreign particles or debris often found in water drawn from nearby streams for use in filling the portable "dump-and-go" tank.

In a still more particular sense, the invention lies in the field of those portable inlet structures weighted in such a fashion as to lie stably upon the tank bottom without the need for being attached thereto, and especially those structures falling in this category in which adjustments can be readily made as to the angle at which the attached hose portion extends in respect to the horizontal.

2. Description of the Prior Art

Heretofore, suction heads, normally equipped with strainers, for use in the circumstances touched upon above, have been broadly known. U.S. Pat. No. 3,613,894 shows such a device, but this patent, in keeping with other patents covering structures intended for the same purpose, has certain deficiencies in respect to, for example, the angle at which the attached hose portion extends from the tank bottom. Fire hoses are of substantial diameter, and of rather limited flexibility, in many instances. The inherent flexibility of the fire hose may be reduced even more when the hose is filled with water being pumped from a tank in which the hose is submerged. As a result, the inlet head may be cocked or even completely inverted in respect to the tank bottom. This prevents drawing of water below a level which may still be substantially above the tank bottom, in a situation in which it would be important to pump water with an absolute minimum of delay, fully to or at least in very close proximity to the bottom of the tank.

SUMMARY OF THE INVENTION

Summarized briefly, the device comprising the present invention includes a flat, rectangular base which may desirably be slightly dished by the provision of an upwardly inclined peripheral lip. Extending upwardly from the base are side walls having threaded openings, and supported upon the side walls is a rectangular retaining plate, having slots receiving thumb screws extending into the threaded openings or recesses of the side walls. The retaining plate can thus be slidably adjusted back and forth in its own plane, and in each position to which it is adjusted, it is capable of being fixedly secured by means of thumb screws extending through the slots into the threaded recesses.

The retaining plate has a wide, transverse slot receiving a suction cylinder having an inlet opening in which a screen or other straining device can be mounted if desired. The cylinder is integral with a generally flat hollow hose connector portion merging into a hose coupling to which a conventional fire hose can be connected.

The cylinder is eccentrically, pivotally mounted upon the side walls of the base, so as to permit pivotal adjustment of the hose coupling to selected positions, according to the particular angle at which it is desired that the hose extend upwardly from the bottom of the tank in which the inlet head is submerged. With the thumb screws loosened, the adjustment of the inlet nozzle defined by the cylinder, connector portion and hose coupling is adapted to slidably shift the retaining plate. When the coupling has been located at the selected angle in respect to the tank bottom, the thumb screws are turned to lock the retaining plate, and hence the inlet nozzle, in the selected position of adjustment.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is an exploded perspective view of the inlet suction head comprising the present invention;

FIG. 2 is a side elevational view thereof in which the hose connector means and retaining plate are illustrated in full and dotted lines in different positions in which they may be adjusted;

DETAILED DESCRIPTION OF THE PREFERRED EMBODIMENT

Figure 3:
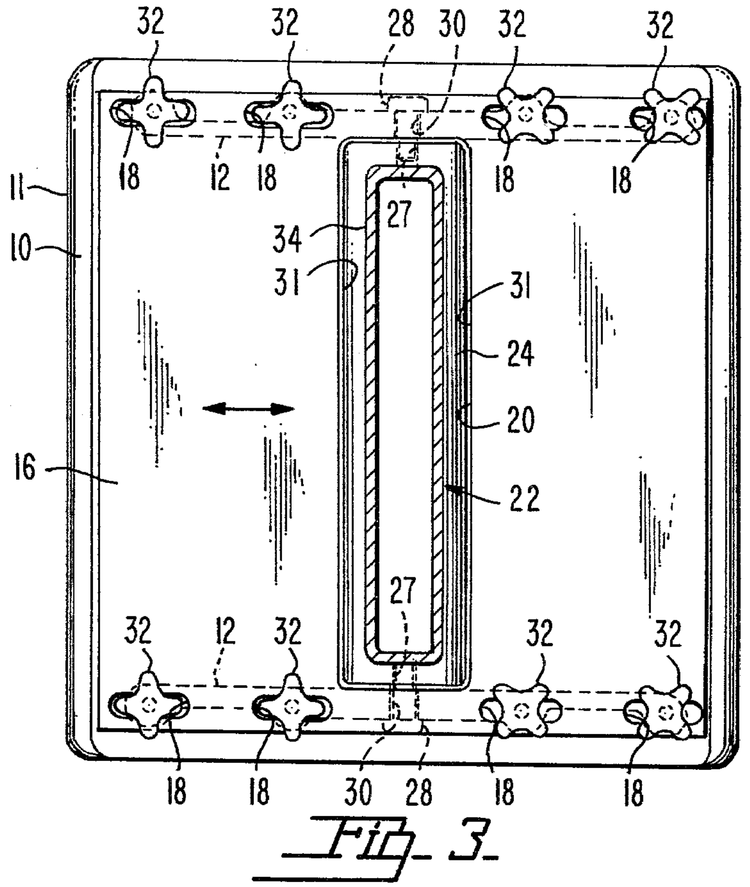
FIG. 3 is a horizontal section substantially on line 3—3 of FIG. 2 in which the hose connector means has been adjusted to a vertical position, taken substantially on line 3—3 of FIG. 2.

The device comprising the present invention can be adapted for use at any of various locations at which water is to be pumped out of a tank. Most usually, however, the invention would be usable to particular advantage by fire companies, especially at rural locations where water is not readily available.

In such instances, it is common for the fire company to utilize a "dump-and-go" tank. This comprises, basically, a portable tank which can be quickly set up directly at the scene of the fire. Tank trucks can shuttle back and forth between the tank and the nearest available source of water, such as a stream, pond, or the like.

In such instances, the practice is to utilize an inlet suction head coupled to a length of hose leading to the intake of a pump used for supplying water under pressure to the fire hoses used to fight the fire.

In such cases, the suction head is first coupled to the inlet end of the hose, and then is dropped into the tank. The inlet head is so designed as to come to rest on the bottom in a position in which it will remain stable. It is further of importance that it be positioned to permit water to be pumped out of the tank almost to the bottom thereof.

To this end, the inlet head comprising the present invention includes a flat, rectangular base 10, adapted to come to rest upon the bottom wall of the tank T. Preferably, the base has a slightly raised, rounded, peripheral lip 11. This reduces the possibility of its hanging up on an internal portion of the tank. Further, this construction minimizes damage to the tank wall if, for example, the inlet head is hastily thrown into the tank under circumstances where a sharp corner of the base might strike a portion of the tank wall and weaken or rupture it to an extent that would cause leaks to develop therein.

Referring particularly to FIG. 1, extending upwardly from the shallowly dished base 10, and formed integrally with the base, are upstanding, low side walls 12 extending along the respective, opposite sides of the base for almost the full length thereof. In the illustrated embodiment, walls 12 have enlarged portions 13 in which upwardly opening, threaded recesses 14 are formed.

A rectangular, flat top plate 16 is supported upon the walls 12 whereby to define between the base and the plate 16 an inlet chamber 17 (see FIG. 4) closed by the side walls 12 along the respective sides of the inlet head, but wholly open over the full width of the head at the ends thereof. This permits water to enter the inlet chamber 17 at both ends thereof, as shown by the direction arrows in FIG. 2, during the use of the device.

Top plate 16 is formed, adjacent the respective longitudinal edges thereof, with elongated slots 18. A series of the slots 18 is provided along each side of the top plate (see FIG. 1), the slots of each series being extended longitudinally of the retaining plate 16. Intermediate the opposite ends of the retaining plate, there is a wide, single, transverse center opening 20, adapted to receive the inlet end portion of a hose connector member generally designated 22.

The hose connector member 22 is formed, at its intake end, with a transversely disposed suction cylinder 24 dimensioned to fit snugly within the center opening 20, though not so tightly as to prevent rotatable movement of the cylinder 24 during adjustment thereof in a manner to be presently described.

Figure 4:
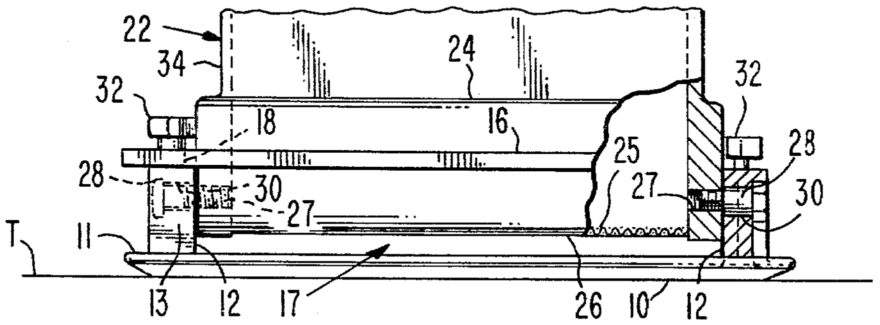
FIG. 4 is a view of the suction head as seen from the left of FIG. 2, a portion being shown in transverse section.

The cylinder 24 is in the form of a hollow, transversely extending element of circular cross section, into which water is drawn from the inlet chamber 17 through a screen or strainer 25 covering a transversely extending, downwardly facing inlet opening 26 extending substantially the full length of the cylinder (see FIGS. 1 and 4).

The screening 25 may be left off, but is desirable for the purpose of preventing debris from entering the hose connector member during the pumping operation. The screening might, it is believed, alternatively be provided in position extending across the open ends of the inlet chamber 17 in which event the screening would be secured to and would extend between the ends of the walls 12, while being left unattached to the retaining plate 16 so as to permit the retaining plate to be adjusted back and forth in the direction of its length in respect to the base 10.

The suction cylinder 24, and hence the entire base connector member 22, is mounted for rotatable or pivotal adjustment, as for example between the opposite extreme positions shown in FIG. 2. The hose connector member 22 could, as will be understood, be adjusted to any of various positions between the extreme full line and dotted line positions of FIG. 2, and might, for example, be positioned substantially vertically as shown in FIGS. 3 and 4.

In any event, in order to accomplish the rotatable adjustment, while preventing the admission of water except through the open ends of the inlet chamber 17, the retaining plate is adapted for slidable adjustment responsive to or concurrently with the swinging adjustment of the hose connector member. To this end, the opposite ends of the cylinder are formed, in the illustrated example, with threaded openings 27 (see FIG. 4), adapted to receive screws 28, having enlarged, smooth walled portions rotatable in pivot openings 30 formed in the respective side walls 12 substantially midway between the opposite ends thereof. This mounts the cylinder 24 for eccentric pivotal movement about the axis of the screws 28, between opposite extreme positions shown in FIG. 2 in full and dotted lines respectively.

The extent to which the cylinder 24 may be rotated about the pivot pins is limited by the length of the slots 18 of the upper or retainer plate 16. Referring to FIG. 3, the opening 20 of the plate 16 has transversely extending front and back edges 31, which are in closely spaced relationship to the wall of the cylinder 24, in all positions to which the cylinder is rotatably adjusted through its eccentric path about the pin 28. Accordingly, it may be assumed that if the hose connector member is swung about the pivot axis thereof to a selected position of adjustment, it will carry with it the retainer plate 16, which will slide in its own plane upon the top surfaces of the side walls 12 of the base. In this connection, thumb screws 32 are provided, extending through the slots 18 into the threaded recesses 14 of side walls 12. With the thumb screws backed off, the plate 16 is free to slide back and forth in the direction of the arrows shown in FIGS. 1 and 3. Therefore, the extent to which the cylinder 24 may be rotatably adjusted is ultimately determined by the length of the slots 18, the ends of which will engage the screws 32 at the opposite limits of the permitted adjustment.

When the hose connector member has been swung about the pivot pins 28 to a selected position of adjustment, camming the plate 16 in its own plane to a corresponding adjusted position within the range permitted by the length of the slots 18, the adjustment is preserved by tightening the thumb screws 32 against the top surface of the plate 16. This locks the plate 16 against movement in respect to the base, and accordingly locks the hose connector member in the selected position to which it has been rotatably adjusted. The locking of the cylinder results from the fact that any tendency on the part of the cylinder to move from its adjusted position is resisted by engagement of the cylinder wall by edges 31 of center opening 20 of plate 16.

The particular construction of the hose connector member is illustrated to particular advantage in FIGS. 1 and 2. The hose connector member 22 is formed, at its intake end, with a wide, hollow, flattened intake portion 34 integral or otherwise rigid with the cylinder 24 over almost the full length of the cylinder, and disposed in constant communication with the cylinder. The intake portion 34, in a direction away from the cylinder, is progressively narrowed, and at the same time, the flattened cross section thereof is progressively merged into a circular outlet portion 36 having a quick thread 38 to permit connection thereto of a hose coupling ring 40 having radial arms or handles 48, and adapted to connect a hose H to the outlet portion 36 of the hose connector member 22.

To facilitate grasping of the entire device, and also to facilitate adjustment of the hose connector member about its pivot axis, there is preferably provided a handle 42 integral or otherwise made rigid with the hose connector member.

As previously noted, the adjustment of the hose connector member can be made before the device is submerged within the tank T. The adjustment may be desired, for example, according to the particular on-site relative positioning of the tank and pump. Or, the adjustment may be influenced by the height of the side wall of the tank. In any event, the adjustment is desirable because the hose H is often of limited flexibility, particularly when submerged with a column of water being pumped therethrough, as a result of which the hose may tilt or even overturn the inlet head during actual use if not extended at a proper, selected angle relative to the tank bottom.

It is of course desirable that in each position to which the hose connector member if adjusted, the entry of water be limited to the areas designed for this specific purpose. Thus, referring to FIG. 2, and noting the direction of the arrows used to indicate the path of movement of the water, it will be observed that no water can enter through the space between the cylinder 24 and the edges of the center opening 20 of the top plate 16. Instead, the water must enter through the open ends of the inlet chamber 17, from which it passes into the screened opening 26. Since the tank water is often drawn from springs or ponds or other natural bodies of water, the water may be dirty, and may have considerable amounts of debris or other foreign particles that should be denied admission to the hose connector member so as not to foul the pump or the fire hose couplings or discharge nozzles.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An intake head for a hose, said head being of the suction type and being adapted for submergence within a water supply tank having a generally horizontal bottom, comprising:

(a) a base adapted to rest on the bottom of the tank;

(b) a hose connector member mounted on the base for rockable movement to selected positions of angular adjustment in respect to the tank bottom, said member having an inlet and having an outlet connectable to a hose;

(c) a retainer plate mounted on the base for back-and-forth sliding movement and cooperating therewith in defining an inlet chamber through which water may pass to the hose connector member inlet, said plate having an opening snugly receiving the hose connector member while leaving the same free for said rockable adjustment concurrently with said back-and-forth sliding movement of the retainer plate; and (d) means for locking the retainer plate against movement in respect to the base in each position to which the retainer plate is moved, said retainer plate when locked in position being disposed with at least one edge thereo presenting an abutment engaging the hose connector member against movement from its selected position of angular adjustment.

2. An intake head for a hose as in claim 1 wherein the hose connector member includes an intake cylinder extending transversely of the base and mounted on the base for rotation about a pivot axis eccentric to the cylinder axis to provide for said rockable movement of the hose connector member.

3. An intake head for a hose as in claim 2 wherein the retainer plate opening extends transversely thereof to receive the cylinder and is formed with side edges presenting abutments to the cylinder, the retainer plate being mounted on the base to slide in its own plane responsive to said rotatable adjustment of the cylinder.

4. An intake head for a hose as in claim 1 further including screen means on the hose connector member adapted to prevent entry of debris into the hose connector member.

5. An intake head for a hose as in claim 1 wherein the base includes sidewalls on which the retainer plate is supported, said sidewalls having threaded openings, the retainer plate having slots registering with said threaded openings, said means for locking the retainer plate in selected positions to which it is moved comprising screws extending through the slots and engaged in the threaded openings.

6. An intake head for a hose as in claim 5 wherein the retainer plate opening extends transversely thereof, said hose connector member extending into the transverse opening of the retainer plate, the edges of the transverse opening of the retainer plate presenting said abutment means to the hose connector member to engage the same in each position to which the hose connector member is rockably adjusted, thereby to prevent movement of said member from the selected position of rockable adjustment responsive to tightening of the screws against the retainer plate.

7. An intake head for a hose as in claim 6 wherein the hose connector member has a transversely extending cylinder formed with an inlet opening, the inlet opening of the cylinder being in communication with the space between the base and the retainer plate, said cylinder being extended within the transverse opening of the retainer plate for engagement by the retainer plate in each position to which the hose connector member is rockably adjusted.

8. An intake head for a hose as in claim 7 wherein the hose connector member further includes a hollow intermediate portion communicating with the cylinder and extending outwardly from the retainer plate, said member further including a hose coupling portion in communication with the intermediate portion.

9. An intake head for a hose as in claim 8 wherein the intermediate portion of the hose connector member is of flattened cross-section at its juncture with the cylinder, said intermediate portion assuming a generally circular cross-section at its juncture with the hose coupling portion of the hose connector member.

10. An intake head for a hose, said head being of the suction type and being adapted for submergence within a water supply tank having a generally horizontal bottom, comprising:

(a) a base adapted to rest on the bottom of the tank;

(b) a hose connector member mounted on the base for adjustment to selected angularities in respect to the tank bottom, said member having an inlet and having an outlet connectable to a hose;

(c) a retainer plate movably mounted on the base and cooperating therewith in defining an inlet chamber through which water may pass to the hose connector member inlet; and (d) means for locking the retainer plate against movement in respect to the base in each position to which the retainer plate is moved, said retainer plate when locked in position engaging the hose connector member against movement from its selected position of angular adjustment, the hose connector member including an intake cylinder extending transversely of the base and mounted on the base for rotation about a pivot axis eccentric to the cylinder axis to provide for said swingable movement of the hose connector member, the retainer plate having a transverse opening receiving the cylinder and formed with side edges presenting abutments to the cylinder, the retainer plate being mounted on the base to slide in its own plane responsive to said rotatable adjustment of the cylinder, the retainer plate being lockably engageable with the base in each position to which the retainer plate is slidably moved responsive to said rotatable adjustment of the cylinder, whereby the edges of the retainer plate opening in which the cylinder is disposed present abutment means to the cylinder preventing rotatable movement of the cylinder from each position to which it is rotated.

11. An intake head for a hose as in claim 10 wherein the retainer plate is formed with longitudinal series of slots, the means for locking the retainer plate comprising screws threadedly engaged with the base and extending through said slots.

12. An intake head for a hose as in claim 11, said screws and slots limiting the slidable movement of the retainer plate upon the base, thereby to limit the rotatable adjustment of the cylinder upon the base.

13. An intake head for a hose, said head being of the suction type and being adapted for submergence within a water supply tank having a generally horizontal bottom, comprising:

(a) a base adapted to rest on the bottom of the tank;

(b) a hose connector member mounted on the base for adjustment to selected angularities in respect to the tank bottom, said member having an inlet and having an outlet connectable to a hose;

(c) a retainer plate movably mounted on the base and cooperating therewith in defining an inlet chamber through which water may pass to the hose connector member inlet; and (d) means for locking the retainer plate against movement in respect to the base in each position to which the retainer plate is moved, said retainer plate when locked in position engaging the hose connector member against movement from its selected position of angular adjustment, said retainer plate being mounted for back and forth sliding movement upon the base, said retainer plate in each position to which it is slidably moved being adapted to present an abutment to the hose connector member for engaging the hose connector member against swingable movement from a selected position of angular adjustment to which it has been moved in respect to the base, said means for locking the retainer plate in each position to which it is moved being normally operable to positions freeing the retainer plate for said movement thereof, whereby said hose connector member when being swingably adjusted will engage the abutment means of the retainer plate and will shift the retainer plate upon the base responsive to the swingable adjustment of the hose connector member, said means for locking the retainer plate being adapted to frictionally engage the retainer plate against the base following swingable adjustment of the hose connector member, whereby to lock the base, retainer plate, and hose connector member against relative movement following the swingable adjustment of the hose connector member.

* * * * *